(No Model.)

G. R. CULLINGWORTH.
INLET VALVE FOR AIR COMPRESSORS.

No. 287,004. Patented Oct. 23, 1883.

Witnesses:
Ed. L. Moran
Fredk Hayner

Inventor:
George R. Cullingworth
by his Attorneys

UNITED STATES PATENT OFFICE.

GEORGE R. CULLINGWORTH, OF NEW YORK, N. Y.

INLET-VALVE FOR AIR-COMPRESSORS.

SPECIFICATION forming part of Letters Patent No. 287,004, dated October 23, 1883.

Application filed January 16, 1883. (No model.)

*To all whom it may concern:*

Be it known that I, GEORGE R. CULLINGWORTH, of the city, county, and State of New York, have invented a new and useful Improvement in Inlet-Valves for Air-Compressors, of which the following is a specification, reference being had to the accompanying drawings.

Most inlet-valves for air-compressors which have been heretofore used have been provided with and supported by a central stem which passes vertically through a guide in the valve seat or casing. This construction is objectionable on account of the obstruction which the stem and the guide offer to the free passage of the air; and it is recognized to be of the greatest importance that the current of air passing through the valve should have as free a passage as possible.

To accomplish this result is the purpose of my invention, which consists in making the valve of a hollow cylinder or sleeve joined to the valve-head by a bridge or skeleton connection, and leaving an annular space for the passage of the air between the cylinder or sleeve and the valve-head. This construction dispenses with the valve-stem, and the hollow sleeve of the valve is its own guide in the valve-casing.

Figure 1:
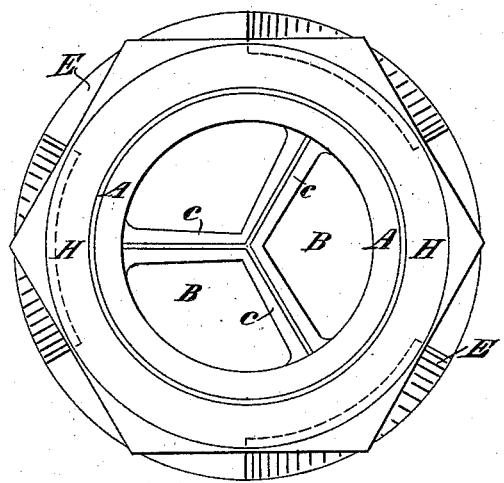
Figure 2:
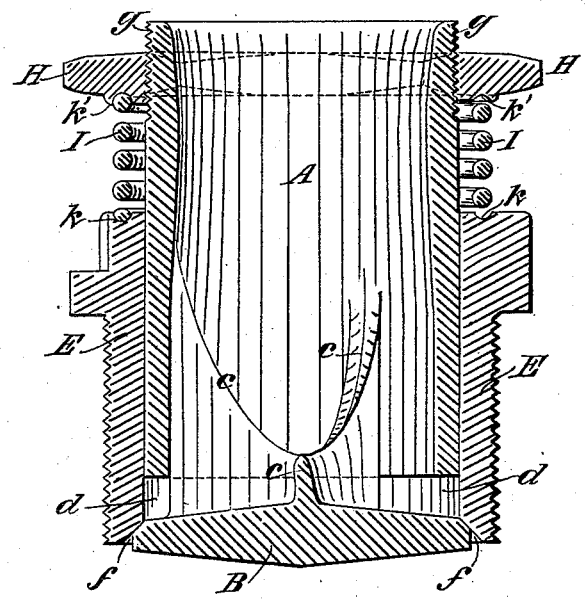

In the accompanying drawings, Figure 1 represents a plan of my improved inlet-valve and its casing. Fig. 2 represents a longitudinal section of the same with the valve closed.

A represents a hollow cylindrical valve-sleeve, which is connected to the valve-head B by a bridge or skeleton support, *c c c*, having an annular air space or passage, *d*, between the said sleeve and valve-head, which space is only limited by the bridge or support *c c c*. The sleeve A is inclosed within an annular casing, E. This casing E, upon which is the valve-seat *f*, is provided with an external screw-thread, for the purpose of securing it in the cylinder or an air-chamber of an air-compressor. The sleeve A in the example represented is provided at its upper end with an external screw-thread, *g*, upon which a nut, H, is adapted to turn. I is the spring which encircles the sleeve A, and serves to close the valve. The casing E and the nut H are each provided with an annular groove, *k k'*, to support the spring and keep it in place. The object of the nut H is to regulate the tension of the spring. The air entering the hollow valve-sleeve A from above will strike against the valve-head B, forcing it down, and with it the valve-sleeve. The air will then escape through the annular air-passage *d*, when, the pressure of the air being removed from the valve-head, the spring I will force the valve up against the seat *f*, thus closing the valve again.

What I claim as my invention, and desire to secure by Letters Patent, is—

1. An inlet-valve for an air-compressor, composed of a hollow cylinder or sleeve, and a head connected therewith by a skeleton bridge, and having an annular opening between said sleeve and head, substantially as described.

2. An inlet-valve for an air-compressor, composed of a hollow cylinder or sleeve connected to the valve-head by a skeleton bridge, with an annular opening between said sleeve and valve-head, and having a screw-thread and nut upon the upper portion of the sleeve for the purpose of regulating the tension of the spring which closes the valve, all substantially as shown and described.

G. R. CULLINGWORTH.

Witnesses:
FREDK. HAYNES,
ED. L. MORAN.